United States Patent
Watanabe et al.

(10) Patent No.: US 8,858,809 B2
(45) Date of Patent: Oct. 14, 2014

(54) METHOD OF MANUFACTURING MAGNETIC RECORDING MEDIUM

(75) Inventors: Akira Watanabe, Kanagawa-ken (JP); Kaori Kimura, Kanagawa-ken (JP); Kazutaka Takizawa, Kanagawa-ken (JP); Takeshi Iwasaki, Tokyo (JP); Tsuyoshi Onitsuka, Tokyo (JP); Akihiko Takeo, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 13/607,134

(22) Filed: Sep. 7, 2012

(65) Prior Publication Data
US 2013/0248485 A1    Sep. 26, 2013

(30) Foreign Application Priority Data

Mar. 22, 2012    (JP) ................ P2012-065654

(51) Int. Cl.
*B44C 1/22*    (2006.01)
*C03C 15/00*    (2006.01)
*G11B 5/09*    (2006.01)

(52) U.S. Cl.
USPC .......... 216/22; 216/41; 216/58; 216/67; 360/48; 360/135; 427/127; 427/130; 427/526; 438/3; 438/689; 438/710

(58) Field of Classification Search
CPC ...... G11B 5/746; G11B 5/8404; G11B 5/855; B82Y 10/00; H01L 21/32139; C23F 1/16
USPC ..................................... 216/22, 47
See application file for complete search history.

(56) References Cited

U.S. PATENT DOCUMENTS

| 7,160,477 B2 * | 1/2007 | Bandic et al. ............. 216/22 |
| 7,411,264 B2 * | 8/2008 | Kamarajugadda et al. ... 257/422 |
| 7,470,374 B2 * | 12/2008 | Hattori et al. .............. 216/22 |
| 7,783,119 B2 | 8/2010 | Kajiwara |
| 2005/0284842 A1 * | 12/2005 | Okawa et al. ............. 216/22 |

(Continued)

FOREIGN PATENT DOCUMENTS

| JP | 10-327418 | 12/1998 |
| JP | 2002-359138 A | 12/2002 |

(Continued)

OTHER PUBLICATIONS

JP Office Action, Patent Application No. 2012-065654, dated May 13, 2014.

*Primary Examiner* — Nadine Norton
*Assistant Examiner* — Christopher Remavege
(74) *Attorney, Agent, or Firm* — Patterson & Sheridan, LLP (57) ABSTRACT

A manufacturing method of a magnetic recording medium includes steps of forming a magnetic recording layer, a first mask layer, a second mask layer containing silicon as primary component, a strip layer, a third mask layer, and a resist layer, a step of patterning the resist layer to provide a pattern, steps of transferring the pattern to the third mask layer, to the strip layer, and to the second mask layer, a step of removing the strip layer by wet etching and of stripping the third mask layer and the resist layer above the magnetic recording layer, steps of transferring the pattern to the first mask layer and to the magnetic recording layer, and a step of stripping the first mask layer remaining on the magnetic recording layer.

18 Claims, 4 Drawing Sheets

(56) References Cited

U.S. PATENT DOCUMENTS

| | | |
|---|---|---|
| 2011/0235212 A1 | 9/2011 | Sakurai et al. |
| 2012/0028076 A1* | 2/2012 | Iwasaki et al. ............... 428/810 |
| 2012/0028373 A1* | 2/2012 | Belen et al. ..................... 438/3 |
| 2012/0052328 A1 | 3/2012 | Sakurai et al. |
| 2012/0206834 A1* | 8/2012 | Ueda et al. ..................... 360/86 |

FOREIGN PATENT DOCUMENTS

| | | |
|---|---|---|
| JP | 2010-009709 | 1/2010 |
| JP | 2010-146668 | 7/2010 |
| JP | 2010-146668 A | 7/2010 |
| JP | 2010-250872 A | 11/2010 |
| JP | 2011-138586 | 7/2011 |
| JP | 2011-205683 | 10/2011 |
| JP | 2012-033223 A | 2/2012 |
| JP | 2012-053954 A | 3/2012 |
| WO | 2007-148619 A1 | 12/2007 |
| WO | 2011-049120 A1 | 4/2011 |

\* cited by examiner

METHOD OF MANUFACTURING MAGNETIC RECORDING MEDIUM

CROSS-REFERENCE TO RELATED APPLICATION

This application is based upon and claims the benefit of priority from Japanese Patent Application No. 2012-065654, filed on Mar. 24, 2012; the entire contents of (if multiple applications, all of) which are incorporated herein by reference.

FIELD

An embodiment described herein relates to a manufacturing method of a magnetic recording medium.

BACKGROUND

A magnetic recording medium may include a patterned medium above which a read-write head flies at a flying height of 10 nm or less. Consequently, the surface properties of the patterned medium are important. For stable flight of the read-write head over the patterned medium, it is necessary to completely eliminate residual hard masks, which are required as part of the manufacturing process. Also, it is necessary for the patterned medium to have a very smooth surface, which is accomplished by eliminating particles that may be present on the surface after a stripping process. Methods of eliminating hard masks from a patterned medium include a dry strip process that performs the strip in a vacuum and a wet strip process that performs the strip using a liquid solution.

The wet strip process is effective in removing particles; however, there are some drawbacks. In such a process, a strip agent contacts an exposed recording layer for the duration of the strip process, which can damage the recording layer. Also, a substrate with a recording layer that has been processed for a strip treatment needs to be exposed to air, so that a layer of oxidation might be formed on the exposed surface of the recording layer. In contrast, in a dry strip process, it is difficult to completely remove particles that are made of different materials, and consequently the recording layer may be damaged during a dry strip process when process is performed in a way that completely removes particles.

Also, in a case where a wet strip is performed before a pattern is transferred to a dry strip layer of a magnetic recording medium on which a dry strip layer, a wet strip layer, and/or a patterning layer are laminated, the pattern is completely stripped. In contrast, in a case where a pattern is transferred to the dry strip layer, the surface of the magnetic recording medium is exposed, and the magnetic recording layer may be damaged by the solution used in the wet strip process.

BRIEF DESCRIPTION OF THE DRAWINGS

FIG. 1A through 1J illustrates one example of manufacturing steps of a magnetic recording medium according to an embodiment.

FIG. 2A through FIG. 2J illustrate another example of manufacturing steps of a magnetic recording medium according to an embodiment.

DETAILED DESCRIPTION

According to embodiments described herein, a manufacturing method of a magnetic recording medium includes steps of forming a magnetic recording layer, a first mask layer, a second mask layer containing silicon as primary component, a strip layer, a third mask layer, and a resist layer, a step of patterning the resist layer to provide a pattern, steps of transferring the pattern to the third mask layer, to the strip layer, and to the second mask layer, a step of removing the strip layer by wet etching and of stripping the third mask layer and the resist layer above the magnetic recording layer, steps of transferring the pattern to the first mask layer and to the magnetic recording layer, and a step of stripping the first mask layer remaining on the magnetic recording layer.

Hereinafter, referring to the drawings, further detailed descriptions of an embodiment are given.

FIG. 1A through FIG. 1J illustrate one example of a manufacturing method of a magnetic recording medium according to the embodiment.

Figure 1A:
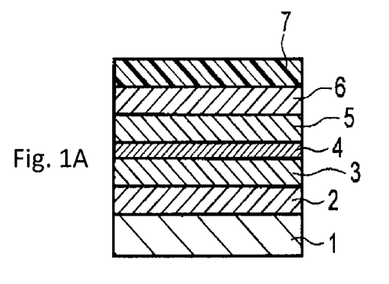
Figure 1B:
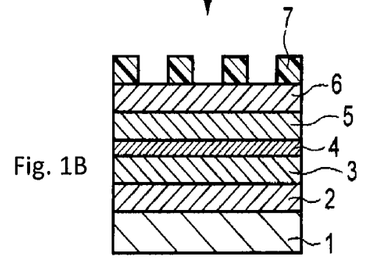
Figure 1C:
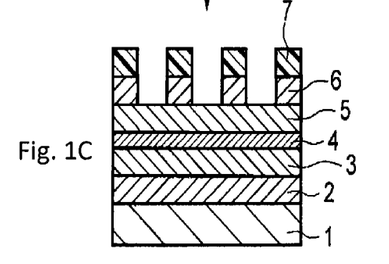
Figure 1D:
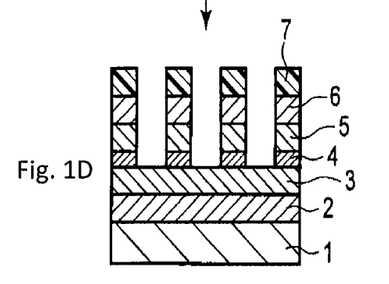

The manufacturing method of the magnetic recording medium according to the embodiment includes: as illustrated in FIG. 1A, a step of forming a magnetic recording layer 2 on a substrate 1 and a step of forming a laminated structure that includes the multiple mask layers 3, 4, 5, and 6 on the magnetic recording layer 2; and as illustrated in FIG. 1B through FIG. 1H, a step of patterning the multiple mask layers 3, 4, 5, and 6.

As illustrated in FIG. 1A, the step of forming a laminated structure that includes the multiple mask layers 3, 4, 5, and 6 includes: a step of forming the first mask layer 3; a step of forming the second mask layer 4 on the first mask layer 3; a step of forming the strip layer 5 on the second mask layer 4; a step of forming a third mask layer 6 on the strip layer 5; and a step of forming a resist layer 7 on the third mask layer.

Figure 1E:
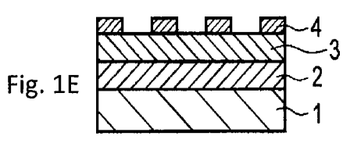
Figure 1F:
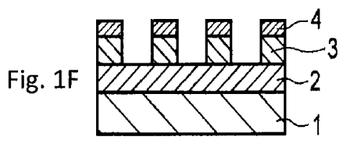
Figure 1G:
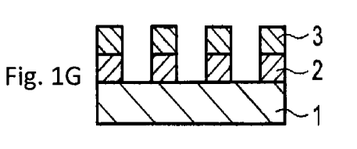
Figure 1H:
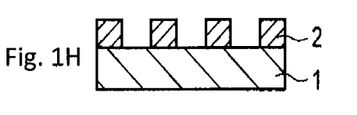
Figure 1J:
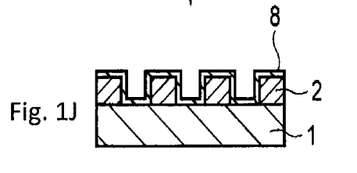

The step of patterning the multiple layers of the mask layers 3, 4, 5, and 6 includes: a step of patterning the resist layer 7 to form a comb-shaped or square-wave-shaped pattern in cross-section view (dot array pattern in plane view) (FIG. 1B) of alternating projections and recesses; a step of extending the comb-shaped pattern to the third mask layer 6 by etching (FIG. 1C); a step of extending the comb-shaped pattern to the strip layer 5 by etching and a step of extending the comb-shaped pattern to the second mask layer 4 by etching (FIG. 1D); a step of removing the strip layer 5 by wet etching and of stripping the third mask layer 6 and the resist layer 7 on the magnetic recording layer 2 (FIG. 1E); a step of extending the comb-shaped pattern to the first mask layer 3 by etching (FIG. 1F); a step of extending the comb-shaped pattern to the magnetic recording layer 2 by etching (FIG. 1G); and a step of stripping the first mask layer 3 remaining on the magnetic recording layer 2 by etching (FIG. 1H). On the magnetic recording layer 1, a protective layer 8 is formed (FIG. 1J).

The first mask layer 3 to be used contains carbon. Also, the second mask layer 4 contains silicon or a silicon compound whose silicon content is 50% or more.

According to the embodiment, the second mask layer 4 that is mainly composed of silicon is disposed under the strip layer 5, and the first mask layer 3 that is mainly composed of carbon is disposed under the second mask layer 4. After a desired pattern is formed in the second mask layer 4, a wet strip is performed on the strip layer 5, and a dry strip is performed on the first mask layer 3. As a result, damage to the magnetic recording layer 2 is avoided.

Thus, the magnetic recording layer 2, the first mask layer 3 mainly composed of carbon, the second mask layer 4 mainly composed of silicon, the strip layer 5, the third mask layer 6, and the resist layer 7 are formed on the substrate 1 with a sequential manufacturing method. Then, the comb-shaped pattern formed on the resist layer 7 is extended down to the second mask layer 4, and the strip layer 5 and the upper third mask layer 6 are removed. At this point, only the unpatterned first mask layer 3 and the patterned second mask 4 remain on the magnetic recording layer 2, as illustrated in FIG. 1E. After that, the comb-shaped pattern of alternating recesses and projections formed in the second mask layer 4 is transferred to the first mask layer 3 and the magnetic recording layer 2. By dry-stripping the first mask layer 3 in a vacuum process, the mask layers formed on the magnetic recording layer 2 are removed. After that, a protective film 8 is formed on a surface thereof.

In the manufacturing steps according to the embodiment, because a wet strip of the strip layer 5 is performed before patterning the first mask layer on the recording layer, the recording layer is not damaged. Therefore, it becomes possible to use a strip solution with a high concentration, a strip solution such as a strong acid, and the like, and this allows an etching speed of the strip layer to be faster and allows manufacturing throughput to be improved.

A film thickness of the first mask layer is set to be between 20 nm and 40 nm. When the film thickness of the first mask layer is less than 20 nm, a function thereof as a mask is not sufficient, and the magnetic recording layer is etched. As a result, a flying characteristic of a head tends to deteriorate. When the film thickness exceeds 40 nm, the pattern transfer property tends to deteriorate.

The first mask layer 3 is stripped by a dry etching process. As a method for dry etching the first mask layer 3, there are reactive ion etching such as inductive coupled plasma-reactive ion etching (ICP-RIE), capacitive coupled plasma-reactive ion etching (CCP-RIE), and the like. Further, reactive ion beam etching, ion beam etching, and the like are available.

When a silicon compound whose silicon content is less than 50% is used for the second mask layer 4, defect rate increases and pattern transfer reliability deteriorates. A film thickness of the second mask layer 4 is set to be, for example, between 2 nm and 10 nm. When the film thickness of the second mask layer 4 is less than 2 nm, the ratio of an interfacial reaction layer to the strip layer 5 is increased and more residue can be generated after the stripping process. As a result, the flying characteristic of a read-write head over such a recording medium tends to deteriorate. When the film thickness exceeds 10 nm, a process time for a pattern transfer is increased, and the pattern transfer property tends to deteriorate.

The strip layer 5 is removed by a wet etching process. As a strip solution for removing the strip layer, it is possible to use a solution that includes at least one of $H_2O_3$, $H_3NSO_3$, $H_3PO_4$, $H_2CO_3$, $H_2SO_3$, $CH_3COOH$, HCOOH, HI, HBr, HCl, $HClO_4$ and $H_2SO_4$, or a combination thereof. According to one embodiment, a strip process is performed in which the upper surface of the magnetic recording layer 2 is protected by the first mask layer 3, so that the magnetic recording layer 2 is not damaged. As a result, it is possible to use HI, HBr, HCl, $HClO_4$, and $H_2SO_4$, which are strong acids whose acid-ionization constant is large, and a strip solvent with a high concentration whose pH is four or less. Therefore, while damage to the recording layer is avoided, manufacturing throughput is also improved.

The third mask layer 6 is used to transfer a desired pattern prepared by a resist or a self-assembling material to the strip layer 5 and the second mask layer 4. For ease of processing, it is preferred to use a material for third mask layer 6 that can be processed by RIE. C, Ta, Si, W, and Mo, and compounds thereof are excellent for processing, and are preferably used. C, Si, and Ta are excellent for such a process, and are further preferred for use because the etch rate of a wide variety of process gases is high when C, Si, and Ta are used as a mask. Specifically, when C or CN is used for the third mask layer 6, oxygen can be used as an etchant; and when Si or Ta is used for the third mask layer 6, fluorine can be used as an etchant. Also, in order to secure an etch selectivity of the third mask layer 6 to the resist layer 7 formed on the third mask layer 6, it is possible to form the third mask layer 6 by laminating multiple mask materials, each having a different preferred enchant.

A film thickness of the third mask layer 6 needs only to be a film thickness that is appropriate for transferring a pattern to the strip layer 5 and the second mask layer 4, and is preferred to be especially from 5 nm to 30 nm. When the film thickness is thinner than 5 nm, mask tolerance during etching is low, and the reliability of pattern transfer tends to be insufficient. Also, when the film thickness is thicker than 30 nm, mask tolerance during etching is not an issue. Therefore, when the film thickness is thicker than 30 nm, there is no problem regarding the transfer property of the pattern; however, process time tends to be unnecessarily long.

The strip layer 5 preferably includes at least one of the elements selected from the group consisting of Mg, V, Mn, Fe, Co, Ni, Zn, Ge, As, Mo, Sb, W, Re, TI, and Pb, alloys thereof, or one or more compounds containing 50 at. % or more of one or more of the elements of the group. When the percentage content of the above elements is less than 50 at. % in the strip layer 5, there is a tendency that the strip layer is less likely to be removed with an acid solution. From ease of etching and a high strip rate, Mo and W are preferred. When a solvent with a high concentrate (pH is four or less) is used as the strip solvent, Mo is further preferred for ease of etching.

A film thickness of the strip layer is preferably from 3 nm to 20 nm ease of processing and stripping. A reaction layer is formed at an interface between the strip layer and the second mask layer. With a film thickness of less than 3 nm, most part of the strip layer converts to the reaction layer, so that there is a tendency for the strip process to become more difficult or that the second mask layer also be removed after the strip. In contrast, with a film thickness of 20 nm or more, strip properties are adequate; however, process time tends to be unnecessarily long.

For the resist layer for providing the comb shaped pattern of alternating projections and recesses on a mask, a resist material that is generally used in the field of semiconductor manufacture is used. As a method for providing the comb-shaped pattern on the resist layer, there are, for example, lithography using energy line, nanoimprint, patterning using a self-assembling film made of a block copolymer having at least two or more types of polymer chains, and the like. When a self-assembling film is used, after forming a microphase separation structure in the film, one type of a polymer phase is selectively removed so that a residual polymer is used as a mask. Thereby, the comb-shaped pattern is transferred.

FIG. 2A through FIG. 2J illustrate another example of the manufacturing method of the magnetic recording medium according to an embodiment.

Steps illustrated in FIG. 2A through FIG. 2J other than the following steps are the same as those illustrated in FIG. 1A through FIG. 1J. Instead of the step of forming the resist layer 7 on the third mask layer 6 (FIG. 1A), a step of forming a self-assembling layer 11 that has at least two types of polymer chains on the third mask layer 6 as another type of the resist layer (FIG. 2A) is performed. Also, instead of providing the comb-shaped pattern on the resist layer 7 (FIG. 1B), a step of separating the self-assembling layer 11 in phases and of selectively removing either polymer layer (FIG. 2B) is performed. Otherwise, FIGS. 2A through 2J are the same as FIGS. 1A through 1J.

Figure 2A:
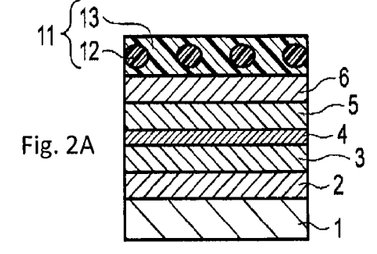
Figure 2B:
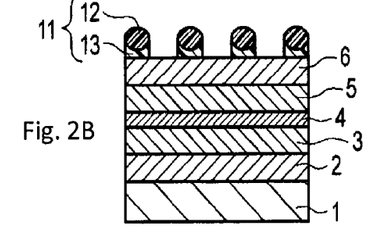
Figure 2C:
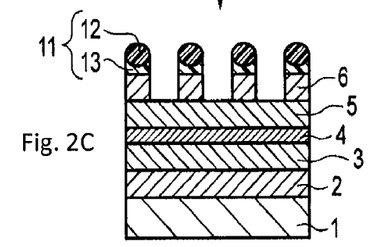
Figure 2D:
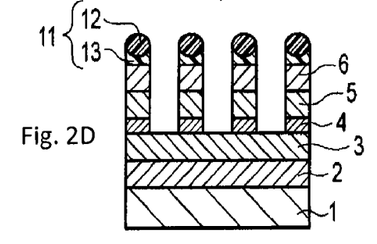
Figure 2E:
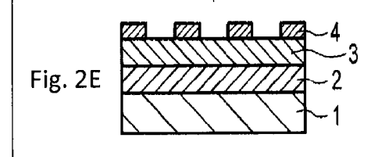
Figure 2F:
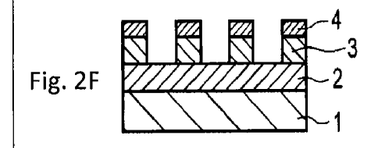
Figure 2G:
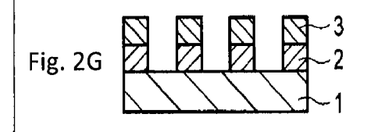
Figure 2H:
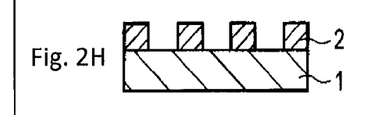
Figure 2J:
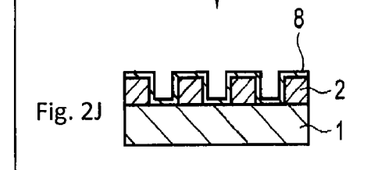

Another comb-shaped/square-wave pattern is formed by selectively removing a phase in a block copolymer. For example, in a diblock copolymer 11 made of a series of polystyrene and a series of polydimethylsiloxane, a pattern of islands of polydimethylsiloxane 12 is formed in a backbone of polystyrene 13 by appropriately setting molecular weight. By etching this and selectively removing either one of the polymer layers 11, for example the backbone of polystyrene 13, a dot state comb-shaped pattern 11 made of polystyrene and polydimethylsiloxane is obtained.

When the comb-shape of the self-assembling layer is formed by etching, in addition to wet etching (in which a sample is immersed in a liquid agent), dry etching in which a chemical reaction due to active species is used, and either are applicable. For performing highly accurate patterning in a thickness direction for a pattern having small features, dry etching that has the ability to suppress etching in a width directions of the feature.

In dry etching of a polymer phase, it is possible to perform patterning as maintaining an etching selectivity by appropriately selecting a type of active gas. Generally, a material containing a lot of C and H, such as a benzene ring, has a high etching tolerance, and is preferred for a mask for processing the comb shape. When a polymer in which polymers having different compositions are appropriately combined as a block copolymer is used, it is possible to have high etch selectivity. As a result, the comb-shaped pattern can be formed. For example, in a diblock copolymer made of a series of polystyrene and a series of polydimethylsiloxane, it is possible to easily remove polydimethylsiloxane by using fluorine-series gas such as $CF_4$ and to easily remove polystyrene by using $O_2$ gas. Also, an etch selectivity between them is ensured.

Figure 3:
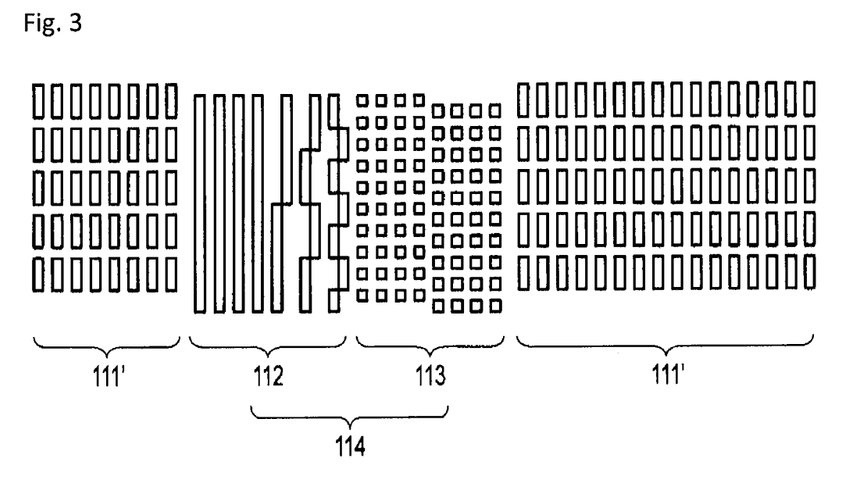
FIG. 3 schematically illustrates an example of recording bit patterns.

FIG. 3 schematically illustrates an example of a recording bit pattern with respect to a circumferential direction of the magnetic recording medium as an example of the comb-shaped pattern.

As illustrated in FIG. 3, the comb-shaped pattern of the magnetic recording layer is roughly classified into a recording bit region 111' and a so-called servo region 114, and is formed with these patterns regarded as in-plane patterns. The recording bit region 111' is a region to which data corresponding to the ones and zeros of digital signals are recorded. The servo region 114 is configured with a preamble address pattern 112 that eventually becomes positioning signals of the magnetic head, and a burst pattern 113. Also, the pattern of the servo region, which is illustrated, may not be a rectangular. For example, all servo patterns may be replaced with a dot shape pattern. Also, in addition to the servo, it is possible to configure a data region with only a dot pattern. Information of one bit is configured with one magnetic dot or a plurality of magnetic dots.

Hereinafter, detailed descriptions of the embodiments are given via multiple examples.

Example 1

The embodiment according to the present application is explained with FIG. 1A through FIG. 1J as follows.
Step of Forming Magnetic Recording Layer First, a magnetic recording layer was formed on a substrate 1 by a direct current (DC) sputtering method. Pressure of Ar gas during film formation was 0.7 Pa. Input power was set at 500 W. From the substrate 1 side, a NiTa underlayer (10 nm thickness)/a Pd under layer (4 nm thickness)/a Ru under layer (20 nm)/a CoPt magnetic recording layer (10 nm) are sequentially formed. As a result, a magnetic recording medium before a patterning process was obtained.
Step of Forming First Mask Layer Next, plural layers of mask layers were formed on the magnetic recording layer. It is assumed that a process of the magnetic recording layer was performed by a physical process using Ar ion milling.

First, a first mask layer made of carbon having a thickness of 30 nm and a second mask layer formed of silicon having a thickness of 5 nm were formed on the magnetic recording layer. Next, a strip layer made of Mo of 5 nm was formed, and a third mask layer made of carbon having a thickness of 20 nm was formed on the strip layer. It was assumed that the strip layer was to be removed by wet etching using an acid solution.

On the third mask layer, a resist was spin-coated such that a thickness thereof was 50 nm. For the resist, ZEP-520A (Nippon Zeon Co.), which was an electron beam resist, was used. Anisole was used as a solvent. The substrate was hardened by pre-baking the substrate for 180 seconds using a hot plate whose temperature was kept at 180° C.
Resist Layer Patterning Using an electron beam lithography device that generates a beam having an acceleration voltage of 100 kV and a beam diameter of 2 nm, pattern lithography was performed to the electron beam resist. For development of the resist pattern, an organic developing solution composed of 100% of n-amyl acetate was used, and the electron beam resist was immersed in the organic developing solution for 20 seconds. Therefore, the development of the electron beam resist was performed. As a result, a resist pattern having the comb shape was obtained.
Step of Forming Comb-Shaped Mask Layer The comb-shaped pattern of the resist is transferred to layers positioned lower than the resist layer by etching.

First, using an inductive coupled plasma (ICP)-RIE device, a pattern transfer to the third mask layer made of carbon was performed. Oxygen was used as a process gas. A chamber pressure was set at 0.1 Pa. Coil radio frequency (RF) power and platen RF power were respectively set at 100 W and 50 W. Etching time was 60 seconds. At this point, the resist is also etched by oxygen; however, because a film thickness of the resist is two or more times greater than a film thickness of the third mask layer, it is easy to etch down to the bottom of a groove portion of the third mask layer.

Next, etching of Mo that configures the strip layer and etching of Si that configures the second mask layer were simultaneously performed using the ICP-RIE device. $CF_4$ was used for a process gas. A chamber pressure was set at 0.1 Pa. Coil RF power and platen RF power were respectively set at 100 W and 50 W. Etching time was 250 seconds.
Step of Stripping A strip was performed by immersing the strip layer made of Mo in $H_2O_2$. The strip solution was prepared, after making a hydrogen peroxide solution having a concentration of 1% by weight, by adding a surface-active agent containing a non-ionic system fluoride to the hydrogen peroxide solution. The sample was immersed therein and the strip was performed. As a result, the third mask layer and the resist layer, which had been above the strip layer, were removed, and a second mask layer having the comb-shape was obtained on the unpatterned first mask layer.
Magnetic Characteristic Evaluation after Strip In order to evaluate damage that the magnetic recording layer received during the step of stripping, an evaluation was performed using the saturation magnetization value (Ms) of the medium and a vibrating sample magnetometer (VSM). As a result, the change ratio of the Ms before and after the strip was 0-0.5%, indicating that a medium with which strip is performed without damaging the magnetic recording layer was obtained.

Step of Processing First Mask

Using the ICP-RIE device, a pattern transfer to the first mask layer through the second mask pattern, which had the comb shape, made of Si was performed. Oxygen was used for a process gas. A chamber pressure was set at 0.1 Pa. Coil RF power and platen RF power were respectively set at 100 W and 25 W. RIE etching time using oxygen was 100 seconds.

Magnetic Body Process and Step of Forming Protective Film

Next, a pattern transfer was performed to the magnetic recording layer through the first mask layer by ion-milling. Herein, an ion-milling device using Ar was used. An acceleration voltage was set at 300 V, a gas flow rate was set at 8 sccm, a milling pressure was set at 0.1 Pa, and a milling time was set at 100 seconds, and then the comb pattern was transferred to the magnetic recording layer.

In an RIE process using oxygen, an etch selectivity of silicon to carbon is 100 or more when the above-described etching condition was applied. Also, by setting the etching time sufficiently long, it is possible to completely remove the first mask layer made of carbon on the magnetic layer.

Lastly, the protective film was formed by a chemical vapor deposition (CVD) process, and a lubricant was applied. As a result, a magnetic recording medium according to the present application was obtained.

In the present example, the process of the magnetic body was performed by milling; however, another method in which an ion, a gas, or the like is injected to the magnetic recording layer is also applicable.

Pattern Shape Evaluation

A shape evaluation of the pattern obtained by the above-described process was performed using a scanning electron microscope (SEM). A defect rate is represented by a percentage obtained by standardizing the number of patterns transferred to the magnetic recording layer using the number of patterns prepared on the electron beam resist. The defect rate is preferably 5% or less, and more preferably is 1% or less.

Comparing the pattern, which was obtained by the above-described process, that has been transferred to the magnetic recording layer with the pattern that was prepared on the electron beam resist, the defect rate was 0.0%, and it was found that the patterns prepared on the electron beam resist were completely transferred.

Glide Evaluation

For the medium obtained by the above-described process, a flying characteristic evaluation of the head was performed. The flying height of the head was adjusted to 5 nm, and the evaluation was performed. Error was not found, and a favorable head flying characteristic was obtained.

Example 2

In the same manner as the example 1, a magnetic recording medium before a patterning process was formed.

First, on the carbon mask layer, a block copolymer solution was applied on a sample. For the block copolymer solution, a solution that a block copolymer, which was made of polystyrene and polydimethylsiloxane, was dissolved in the application solvent that was used. The molecular weights of polystyrene and polydimethylsiloxane were respectively 11,700 and 2,900. Moreover, a polymer solution was prepared at 1.5% of mass percent concentration using propylene-glycol-monomethyl-ether-acetate for a solvent. The spinner application of this solution was performed at 3500 rpm, which is a rotation frequency, on the mask, and the monolayer self-assembling film was formed.

Furthermore, thermal annealing was performed to cause micro phase separation of the dot pattern and the matrix in the self-assembling film. The dot pattern was made of polydimethylsiloxane, and the matrix was made of polystyrene. For the thermal annealing, a vacuum heating furnace was used. Annealing at 170° C. for 17 hours was performed under a decompression atmosphere where a furnace inside pressure was 0.2 Pa, and a micro phase separation structure was formed in the self-assembling film. In addition, an anneal process that exposes a sample in an organic solvent atmosphere, which is a so-called solvent annealing, is also applicable.

Then, the comb-shaped pattern was formed by etching based on the phase separation pattern using an ICP-RIE. First, in order to remove polydimethylsiloxane that is the surface of the self-assembling film, an etching was performed for 7 seconds using $CF_4$ as a process gas and using coil RF power and platen RF power respectively set at 50 W and 5 W.

Next, in order to remove polystyrene of the matrix, etching was performed for 120 seconds using a oxygen gas as a process gas and using coil RF power and platen RF power respectively set at 50 W and 15 W. In this way, the comb-shaped pattern formed of a diblock copolymer was formed. By etching using oxygen, a carbon layer having a thickness of 3 nm formed under the diblock copolymer was etched. Then, Si served as a stopper, and the etching was ended.

Furthermore, the comb-shaped pattern was transferred to the lower mask layer. In the same manner as the formation of the comb-shaped pattern in the self-assembling film, the mask layer was processed by an ICP-RIE. $CF_4$ was used as a process gas for a removing of Si layer, and etching was performed for 40 seconds using coil RF power and platen RF power respectively set at 50 W and 5 W.

Thereafter, in the same manner as the example 1, patterning was performed on the third mask layer, the strip layer, and the second mask layer, and the comb-shaped pattern was transferred to the second mask. After that, the mask on the strip layer was removed by wet etching. At that point, the evaluation of Ms was performed using the VSM, and it was verified that no degradation of Ms before and after strip was verified as with the example 1.

Then, a pattern transfer was performed on the first mask layer and the magnetic record layer, and the magnetic recording medium was obtained by forming the protective film and a lubricating film.

In addition, when the comb-shaped pattern provided in the self-assembling film is transferred to layers positioned under the self-assembling film and the etch selectivity is small, it is favorable to provide another pattern transfer layer between the third mask layer and the self-assembling film. Here, a pattern transfer layer that is formed with two layers—a silicon layer having a 5 nm thickness/a carbon layer having a 3 nm thickness—was inserted on the third mask layer.

The pattern defect rate of the recording medium obtained by the above-described process was evaluated, and it was found that the pattern defect rate was 0.8%. Moreover, a flying characteristic of the head with respect to the produced medium was evaluated. When the head flying height was 5 nm, no error was found, and a favorable flying characteristic of the head was obtained.

Example 3

In the same way as the example 1, a magnetic record substrate before a pattern process was prepared, and multiple mask layers were formed thereon. Carbon having a 30 nm thickness was used for the first mask layer, and a SiO film having a thickness of 5 nm was formed thereon as the second mask layer by forming Si in a chamber where an oxygen flow rate was adjusted. The SiO film was made of a silicon compound in which a content of silicon was 50% or more. Then, the strip layer, the third mask layer, and the resist layer were formed as with the example 1.

Patterning was performed on the third mask layer and the layers positioned above the third mask layer in the same way as that of the example 3, and thereafter SiO which forms the strip layer and the second mask layer was processed. Etching was performed for 40 seconds using $CHF_3$ as an enchant and using coil RF power and the platen RF power respectively set at 50 W and 15 W, and in this way a pattern transfer was performed. Thereafter, a transfer to the first mask layer and the magnetic record layer was performed, and an evaluation of the magnetic property and the pattern shape after the strip was performed. As a result, it was found that there was almost no damage to a magnetic record layer and that it was possible to perform the strip independently from the type of the second mask layer. Also, the pattern defect rate before and after the transfer to the mask layers was evaluated using SEM, and it was verified that the defect rate was 0.5%.

When the substrate in which Si or SiO was used as the second mask layer was analyzed by cross-sectional transmission electron microscopy (TEM) and energy dispersive x-ray analysis (EDX), it was found that a reaction layer in which compositions of both the second mask layer SiO and the strip layer Mo were diffused was formed at an interface between the second mask layer SiO and the strip layer Mo. Due to the existence of the reaction layer, the etching rate difference between the second mask layer and the strip layer at the time of etching becomes small, and the pattern transfer property is improved.

Comparative Example 1

As a comparison with the example 3, a silicon compound $SiO_2$, whose content of silicon is less than 50%, was used for the second mask layer, and a processing, a strip, and an evaluation were performed. For forming the $SiO_2$, a target of $SiO_2$ was used, and a $SiO_2$ layer was formed by forming in an oxygen atmosphere. Thereafter, similar to the example 3, a pattern transfer and a strip were performed, and a pattern shape thereof was evaluated. Also, when the pattern defect rate before and after the transfer was measured and evaluated using the SEM, it was found that the defect rate increased and was 5.2%.

When analysis was performed using the cross-sectional TEM and the EDX, and it was found that there was no reaction layer formed at the interface between the second mask layer $SiO_2$ and the strip layer Mo. When there is no reaction layer, the difference of the etching rates between the layers becomes significant, and the pattern transfer property is deteriorated. It is assumed that the defect rate was increased due to the above-described situations.

Comparative Examples 2-1 and 2-2

As the comparative example 2-1, a substrate was prepared in the same manner as the example 1 except for further transferring a pattern to the first mask layer before performing a strip of the Mo strip layer using $H_2O_2$. The damage to the magnetic record layer by the shape of the first mask was evaluated.

Also, as the comparative example 2-2, a substrate in which a Mo strip layer having a thickness of 5 nm was directly formed without forming the first mask or the second mask on the magnetic record layer.

The three types of the substrates according to the comparative example 2-1, the comparative example 2-2, and the example 1 were immersed in a $H_2O_2$ solution having a concentration of 1% by weight for 30 seconds and 5 minutes, and respective Ms were evaluated by the VSM.

Figure 4:
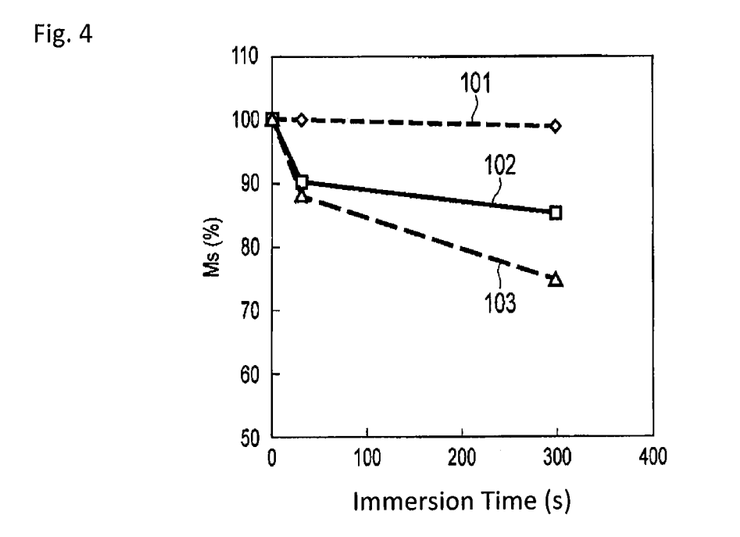
FIG. 4 is a graph that indicates the relationship between the immersion time of a magnetic recording medium in a strip solution and saturation magnetization values (Ms).

FIG. 4 is a graph indicating the relationship between the immersion time and the Ms.

A graph 101 shows the result of the example 1, a graph 102 shows the result of the comparative example 2-1, a graph 103 shows the result of the comparative example 2-2.

As shown in the graph 101, the deterioration of Ms wasn't almost observed in the substrate that was immersed in $H_2O_2$ before processing the first mask, and it was found that the magnetic record layer wasn't almost damaged.

Comparative Example 3

A substrate was prepared in the same way as the example 1, and the first mask was stripped by etching using oxygen, skipping the step that the strip layer is stripped using an acid. Then, the head flying characteristic was evaluated using a glide tester. At the flying height of 12 nm, an error occurred due to the relatively poor evenness of the medium surface, and the favorable head flying characteristic wasn't obtained.

Example 4

Mediums with the different film thicknesses than the first mask thickness were prepared in the same way as the example 1. The film thickness of the first mask was set at (1) 10 nm, (2) 20 nm, (3) 30 nm, (4) 40 nm, and (5) 50 nm, and was changed depending on the etching time shown in the first mask processing process.

For the mediums (1)-(5), an evaluation of the defect rate of the pattern and of drive operation were performed. In the mediums (2)-(4), it was found that the defect rate was 0.5% or less and that an error ratio was $10^{-6}$ or less. On the other hand, in the medium (1), the defect rate was 25%, which was large, and also the error ratio was $10^{-4}$. In the medium (5), the transfer ratio was 18% and the error ratio was $10^{-5}$.

Because the film thickness of the medium (1) is relatively small and the mask did not function adequately, the magnetic recording layer was etched. This may be a reason why the error ratio deteriorated somewhat. Also, the film thickness of the medium (5) is enough; however, an aspect thereof is high, and the sharpness of the mask at the time of processing is deteriorated somewhat. Therefore, it can be assumed that the defect rate of the pattern is increased somewhat, and the error ratio deteriorated somewhat.

Comparative Example 4

Ru was used instead of carbon for the first mask layer, and SiO was used for the second mask layer. The first mask layer and the second mask layer were processed in the same way as the example 1. A film thickness of Ru was set at 30 nm and a film thickness of SiO was set at 5 nm. For a pattern transfer to the first mask layer, an etching process was performed for 110 seconds using oxygen as an etchant and using coil RF power at 100 W and the platen RF power at 10 W. A defect rate of the pattern was measured after the pattern transfer to the magnetic recording layer, and the percentage was 25%. The boiling point of $RuO_4$ is 40° C., which is low, and chemical etching using oxygen is applicable. However, an etching rate thereof is slow (or small) and a process time thereof is long, so that a distribution of etching occurs. It is assumed that the defect rate was increased due to the above-described reason.

Also, for securing the evenness of the medium surface, the strip time of the first mask is long. Therefore, Ru is not suitable to use as the first mask.

On the other hand, in the case of using carbon for the first mask layer as the example 1, carbon generates carbon dioxide together with oxygen and volatilizes when etching is performed using oxygen, for example, as a process gas. Therefore, particles do not remain on the magnetic recording layer after the removal of the first mask layer.

While certain embodiments have been described, these embodiments have been presented by way of example only and are not intended to limit the scope of the invention. Indeed, the novel embodiments described herein may be embodied in a variety of other forms; furthermore, various omissions, substitutions and changes in the form of the methods and systems described herein may be made without departing from the scope of the invention. The accompanying embodiments and their equivalents are intended to cover such forms or modifications as would fall within the scope and spirit of the invention.

What is claimed is:

1. A method of manufacturing a magnetic recording medium, the method comprising:
   forming a magnetic recording layer on a substrate;
   forming a carbon-containing mask layer on the magnetic recording layer;
   forming a silicon-containing mask layer on the carbon-containing mask layer;
   forming a strip layer on the silicon-containing mask layer;
   forming a patterned resist layer on the strip layer;
   forming a pattern of projections and recesses in the silicon-containing mask layer by (i) etching the strip layer and the silicon-containing mask layer to transfer a pattern of the patterned resist layer to the silicon-containing mask layer and (ii) then removing the strip layer remaining on the silicon-containing mask layer using a wet-etching process;
   transferring the pattern of projections and recesses that has been formed in the silicon-containing mask layer to the carbon-containing mask layer using a dry-etching process; and
   forming a pattern of projections and recesses in the magnetic recording layer by (i) transferring the pattern of projections and recesses that has been formed in the carbon-containing mask layer to the magnetic recording layer using a dry-etching process and (ii) then removing the carbon-containing mask layer remaining on the magnetic recording layer using a dry-etching process.

2. The method according to claim 1, wherein said removing the carbon-containing mask layer using the dry-etching process includes etching the carbon-containing mask layer at a higher rate than the magnetic recording layer.

3. The method according to claim 2, wherein the dry-etching process used for removing the carbon-containing mask layer comprises a reactive ion etching process using an oxygen plasma.

4. The method according to claim 1, wherein the carbon-containing mask layer has a thickness greater than or equal to about 20 nm and less than or equal to about 40 nm.

5. The method according to claim 1, wherein the silicon-containing mask layer has a thickness greater than or equal to about 2 nm and less than or equal to about 10 nm.

6. The method according to claim 1, wherein said transferring the pattern of projections and recesses that has been formed in the silicon-containing mask layer to the carbon-containing mask layer comprises removing portions of the carbon-containing mask layer such that recesses having substantially parallel walls perpendicular to the surface of the substrate are formed in the carbon-containing mask layer.

7. A method of manufacturing a magnetic recording medium, the method comprising:
   forming a magnetic recording layer on a substrate;
   forming a carbon-containing mask layer on the magnetic recording layer;
   forming a silicon-containing mask layer on the carbon-containing mask layer;
   forming a strip layer on the silicon-containing mask layer;
   forming a patterned resist layer above the strip layer and the silicon-containing mask layer;
   removing portions of the strip layer and the silicon-containing mask layer to form recesses therein according to a pattern of the patterned resist layer;
   removing the strip layer remaining on the silicon-containing mask layer by a wet-etching process; and
   after the strip layer has been removed by the wet-etching process, removing portions of the carbon-containing mask layer to form recesses therein, such that locations of the recesses in the carbon-containing mask layer correspond to locations of the recesses in the silicon-containing mask layer, and then removing portions of the magnetic recording layer to form recesses therein by a dry-etching process, such that locations of the recesses that have been formed in the magnetic recording layer correspond to locations of the recesses in the carbon-containing mask layer.

8. The method according to claim 7, wherein the portions of the silicon-containing mask layer are removed such that the silicon-containing mask layer is patterned according to a pattern of the patterned resist layer.

9. The method according to claim 7, wherein the portions of the silicon-containing mask layer are removed using a wet-etching process.

10. The method according to claim 9, wherein the wet-etching process comprises a strip layer removal process.

11. The method according to claim 7, wherein the portions of the carbon-containing mask layer are removed using a dry-etching process during which carbon-containing materials are etched at a higher rate than silicon-containing materials and the magnetic recording layer.

12. The method according to claim 7, further comprising:
   removing the carbon-containing mask layer that is remaining on the magnetic recording layer using a dry-etching process during which the carbon-containing mask layer is etched at a higher rate than the magnetic recording layer.

13. The method according to claim 12, wherein the dry-etching process used for removing the carbon-containing mask layer comprises a reactive ion etching process using an oxygen plasma.

14. The method according to claim 7, wherein the carbon-containing mask layer has a thickness greater than or equal to about 20 nm and less than or equal to about 40 nm.

15. A manufacturing method for a magnetic recording medium, comprising the steps of:
   forming a magnetic recording layer on a substrate;
   forming a first mask layer containing carbon on the magnetic recording layer;
   forming a second mask layer that comprises at least 50 atomic percent silicon on the first mask layer;

forming a strip layer on the second mask layer;
forming a third mask layer on the strip layer;
forming a resist layer on the third mask layer;
patterning the resist layer with a pattern of recesses and projections;
transferring the pattern of recesses and projections to the third mask layer;
transferring the pattern of recesses and projections to the strip layer;
transferring the pattern of recesses and projections to the second mask layer;
removing the strip layer by wet etching and stripping the third mask layer and the resist layer above the magnetic recording layer;
transferring the pattern of recesses and projections that has been formed in the second mask layer, above which the strip layer has been removed by wet etching and the third mask layer and the resist layer have been stripped, to the first mask layer;
transferring the pattern of recesses and projections that has been formed in the first mask layer to the magnetic recording layer by dry etching; and
removing the first mask layer remaining on the magnetic recording layer by dry etching.

16. The method according to claim 15, wherein the strip layer includes at least one element selected from the group consisting of magnesium, vanadium, manganese, iron, cobalt, nickel, zinc, germanium, arsenic, molybdenum, antimony, tungsten, rhenium, thallium, and lead.

17. The method according to claim 15, wherein a film thickness of the first mask layer is from 20 nm to 40 nm.

18. The method according to claim 15, wherein the third mask layer includes at least one element selected from the group consisting of carbon, tantalum, silicon, tungsten and molybdenum.

* * * * *